(12) United States Patent
Andre (10) Patent No.: US 7,346,956 B2
(45) Date of Patent: Mar. 25, 2008

(54) AUTOMATIC CART WASH APPARATUS

(76) Inventor: Scott E. Andre, 10612 Deerfield Rd., Cincinnati, OH (US) 45242

( * ) Notice: Subject to any disclaimer, the term of this patent is extended or adjusted under 35 U.S.C. 154(b) by 296 days.

(21) Appl. No.: 11/170,507

(22) Filed: Jun. 29, 2005

(65) Prior Publication Data

US 2006/0107486 A1    May 25, 2006

Related U.S. Application Data

(60) Provisional application No. 60/629,499, filed on Nov. 19, 2004.

(51) Int. Cl.
 *B60S 3/06* (2006.01)
(52) U.S. Cl. .............. 15/302; 15/306.1; 15/309.2; 15/380; 15/381; 15/383; 15/DIG. 2; 134/21; 134/61; 134/72; 134/123; 134/103.2; 134/137
(58) Field of Classification Search ................ None
See application file for complete search history.

(56) References Cited

U.S. PATENT DOCUMENTS

| | | |
|---|---|---|
| 2,997,048 A | 8/1961 | Gertken et al. |
| 3,022,791 A | 2/1962 | Larson |
| 3,096,775 A | 7/1963 | Clarke et al. |
| 3,179,117 A | 4/1965 | Gibson et al. |
| 3,258,019 A | 6/1966 | Bellas et al. |
| 3,289,238 A | 12/1966 | Sorenson et al. |
| 3,444,867 A | 5/1969 | Thornton |
| 4,279,263 A | 7/1981 | Pulliam |
| 4,562,848 A | 1/1986 | Messing et al. |
| 4,807,319 A | 2/1989 | Poitevin |
| 6,090,218 A * | 7/2000 | Brackmann et al. .......... 134/15 |
| 6,427,707 B1 | 8/2002 | Morris |
| 2004/0031507 A1 | 2/2004 | Ross et al. |
| 2005/0061358 A1 | 3/2005 | Fenautrigues et al. |
| 2005/0121057 A1 | 6/2005 | Knowlton et al. |

* cited by examiner

*Primary Examiner*—David Redding
(74) *Attorney, Agent, or Firm*—Pitts & Brittian, PC (57) ABSTRACT

An automatic cart wash apparatus. The automatic cart wash apparatus provides improved cleaning of stock carts on a regular basis over manual cleaning by store employees. The automatic cart wash apparatus includes three main stages: a debris removal (vacuum) stage, a cleaning (wash, sanitize, rinse) stage, and a drying stage. The debris removal stage uses forced air and/or suction to remove solid and generally non-soluble waste, such as a paper or other trash and debris, from a stock cart. The cleaning stage uses a selection of detergents, sanitizing agents, and rinse agents to remove soluble or sticky waste, such as food and liquids, and to kill germs, viruses, and bacteria present on the cart. The drying stage removes excess liquids from the cart making it ready for use by the next customer.

15 Claims, 6 Drawing Sheets

AUTOMATIC CART WASH APPARATUS

CROSS-REFERENCE TO RELATED APPLICATIONS

This application claims the benefit of U.S. Provisional Application No. 60/629,499, filed Nov. 19, 2004.

STATEMENT REGARDING FEDERALLY SPONSORED RESEARCH OR DEVELOPMENT

Not Applicable.

BACKGROUND OF THE INVENTION

1. Field of Invention

This invention relates to the washing and cleansing of stock carts including shopping carts with wire-rack or lattice baskets.

2. Description of the Related Art

Stock carts are generally utilized in transporting the goods intended for purchase through a store to the checkout counter and then in transporting the purchased products on to the customer's vehicle. Throughout the day, stock carts are handled by various people, carry a variety of items, and left outside until returned to the interior of the store. Each of these conditions presents an opportunity for the carts to become soiled. For example, when outside the carts can be soiled by oils and other contaminants in the parking lot, rain, snow, and animal contaminants. Human contact with the cart offers another avenue for contamination of the carts. The carts are handled by multiple customers and store personnel during the day. Each instance can result in the contamination, even unwillingly or unknowingly, with influenza or viral bacteria. Finally, contamination can occur from items are placed into the carts, particularly during the transportation of raw foodstuffs such as raw vegetables, fruits, meat, fish and poultry products, all of which may be dangerous in the uncooked form. It is not uncommon for raw foodstuffs to leak material onto the carts and onto adjacent products placed in the carts.

Contamination may be addressed by periodic cleanings. However, it is extremely labor intensive to manually clean shopping carts. Therefore, it is not economically feasible for a cart to be cleaned after each use with manual cleaning techniques. Some retailers may have a procedure for manually cleaning shopping carts but most conventional shopping carts are created with a wire-type design or plastic injection molds which are very difficult for an operator to clean manually. Even if the cart is cleaned a single time during the day by store personnel, the risk of contamination is reintroduced after the next use of the cart.

Various devices for cleaning shopping carts have been introduced in the past. Typical of the prior art are the devices embodied in the following United States patents.

| Patent Number | Inventor(s) | Issue Date |
| --- | --- | --- |
| 2,997,048 | Gertken, et al. | Aug. 22, 1961 |
| 3,022,791 | Larson | Feb. 27, 1962 |
| 3,096,775 | Clarke, et al. | Jul. 9, 1963 |
| 3,179,117 | Gibson, et al. | Apr. 20, 1965 |
| 3,258,019 | Bellas, et al. | Jun. 9, 1964 |
| 3,289,238 | Sorenson, et al. | Dec. 6, 1966 |
| 3,444,867 | Thornton | May 20, 1969 |
| 4,279,263 | Pulliam | Jul. 21, 1981 |

-continued

| Patent Number | Inventor(s) | Issue Date |
| --- | --- | --- |
| 4,562,848 | Messing, et al. | Jan. 7, 1986 |
| 4,807,319 | Poitevin | Feb. 28, 1989 |
| 6,427,707 | Morris | Aug. 6, 2002 |

U.S. Pat. No. 3,444,867, entitled "Mobile Cart Washer," issued to C. R. Thorton on May 20, 1969, discloses a portable apparatus for cleaning grocery carts. The apparatus of Thorton sprays a heated wash fluid on the carts and includes a reclamation system for reusing the wash fluid. Carts are moved through the system by a chain drive having fingers that separate nested carts to allow the carts to be cleaned individually. A bump on the exit ramp shakes excess water from the carts.

U.S. Pat. No. 4,807,319, entitled "Self Contained High Pressure Hot Water Cleaning System for Grocery Carts," issued to Anton Poitevin on Feb. 28, 1989, discloses a portable apparatus for cleaning grocery carts. The apparatus includes a manual high-pressure pre-wash area and a wash tunnel where a cleaning fluid and a sanitizing fluid are applied to the carts. The wash tunnel includes brushes to scrub the carts and a fluid reclamation system. Carts are carried through the wash tunnel by a conveyor and dried using heated air prior to exiting the apparatus.

U.S. Pat. No. 3,022,791, entitled "Mobile Type Cleaning Unit," issued to A. C. Larson on Feb. 20, 1962, discloses a portable apparatus for cleaning carts. The apparatus of Larson sprays a heated wash fluid and a heated rinse onto the carts and includes a reclamation system for reusing the wash fluid and another reclamation system for reusing the rinse fluid. Carts are dried using a combination of floor ribs that shake excess fluid from each cart and circulating heated air. Carts are moved through the system by a chain drive having a series of hangers that grab a cart and pull it through the apparatus.

U.S. Pat. No. 3,289,238, entitled "Mobile Automatic Steam Cleaning Unit," issued to Dale C. Sorenson, et al., on Dec. 6, 1966, discloses a portable apparatus for steam cleaning grocery carts. The apparatus of Sorenson, et al., uses a chain drive to pull carts through a steam bath. Once steamed, the carts are ejected from the unit.

U.S. Pat. No. 6,427,707, entitled "Mobile Supermarket Trolley Washer," issued to R. J. Morris on Aug. 6, 2002, discloses a portable apparatus for cleaning grocery carts. Carts are carried through the wash tunnel by a conveyor. Cleaning fluids are applied to the cart and an air curtain dries the carts.

U.S. Pat. No. 3,179,117, entitled "Trailer Mounted Cleaner," issued to Rolla Robert Gibson, et al., on Apr. 20, 1965, discloses a portable apparatus for cleaning grocery carts. A heated spray of wash fluid cleans the carts. A chain drive moves carts through the system. The chain drive has lugs to separate nested carts and allow the carts to be cleaned individually. The floor includes a series of grooves and ridges to shake excess water from the carts.

Several other patents are directed to systems for cleanings mobile carts. The cleaning apparatus of U.S. Pat. No. 4,279,263 is a portable cleaning station where carts are manually cleaned on an individual basis. The cart washing apparatus of U.S. Pat. No. 3,096,775 is directed to cleaning tray carts of the type used in hospitals. The design of the tray carts is significantly different from the design of stock carts used in grocery and retail establishments, primarily in that they are closed carts. Jets spray various cleaning and sanitizing fluids over the cart. The cart is dried using an angled floor and gravity to allow excess fluid to run off. Further, carts are manually placed in and removed from the washing by chamber so no provision exists for addressing the unique problems of cleaning nestable wire carts.

U.S. Pat. Nos. 4,562,848 and 3,258,019 are directed to mobile car wash units. In the apparatus of the '019 patent, a car must be driven into a tractor-trailer and cleaning of the vehicle is performed by three workers. In the apparatus of the '848 patent, the car is carried through the wash station and moving wash arms clean the vehicle. While incorporating basic wash features such as washing and rinsing sprays with reclamation systems and drying systems, the car wash systems are not adapted to the unique problems of cleaning high volumes of nestable wire carts.

BRIEF SUMMARY OF THE INVENTION

An automatic cart wash apparatus is shown and described. The automatic cart wash apparatus provides improved cleaning of stock carts on a regular basis over manual cleaning by store employees. The automatic cart wash apparatus includes three main stages: a debris removal (vacuum) stage, a cleaning (wash, sanitize, rinse) stage, and a drying stage. The debris removal stage uses forced air and/or suction to remove solid and generally non-soluble waste, such as a paper or other trash and debris, from a stock cart. The cleaning stage uses a selection of detergents, sanitizing agents, and rinse agents to remove soluble or sticky waste, such as food and liquids, and to kill germs, viruses, and bacteria present on the cart. The drying stage removes excess liquids from the cart making it ready for use by the next customer.

The automatic cart wash apparatus is installed in the cart return area of a retail outlet such as a grocery or department store. The automatic cart wash apparatus includes a frame that provides structure and support for the components of the automatic cart wash apparatus. Proximate to the entrance of the automatic cart wash is the vacuuming stage. Following the vacuuming stage is the cleaning stage. Finally, the drying stage is located after the cleaning stage and proximate to the exit of the automatic cart wash apparatus.

A series of panels enclose the automatic cart wash apparatus to form a closed cleaning system. The panels perform a variety of functions including noise reduction, containment of fluids, and limiting volume to contain and concentrate the flow of forced air and/or suction.

Carts are carried through the automatic cart wash apparatus by a conveyance system. The basic components of the conveyance system include a drive motor operatively linked to a conveyor. In most embodiments, a plurality of cleats engages the frame and transfers the forward motion of the conveyor to the stock cart. A ramp allows stock carts to be moved up to the level of the conveyance system, i.e., the floor level of the automatic cart wash apparatus.

The vacuuming stage includes a blower and an exhaust system. The blower is located proximate to the bottom of the frame and forces air through a cart to cause debris in or on the cart to become airborne. An exhaust vent or hood directs the airborne debris into an exhaust duct leading away from the automatic cart wash apparatus. The debris is transported through the duct by either forced air and/or suction. The exhaust vent is generally positioned opposite to the blower to catch debris dislodged by the blower.

The cleaning stage follows the vacuum stage. The primary function of the cleaning stage is the application of one or more cleaning fluids to the stock cart. The cleaning fluids are selected to remove dirt and grime and/or kill germs and contaminants. The brushes provide scrubbing to assist in the removal of debris attached to the cart. In conjunction with the cleaning fluids, the brushes, thoroughly cleaning the more heavily soiled areas of the cart, such as the child transportation seat and the cart handle. A pair of vertically-mounted brushes scrubs the sides of the cart while a horizontally-mounted brush scrubs the handle and the child transportation seat. The vertically mounted brushes serve to standardize the position of the cart and to provide stability while they are in engagement with the cart.

A first fluid delivery system uses a rotating sprinkler head with high velocity nozzles to spray one or more cleaning fluids onto the cart to remove dirt and grime, sanitize cart surfaces, and/or kill germs. A second fluid delivery system is a stationary, horizontal-bar sprinkler with low velocity nozzles that spray a sheet of cleaning fluids over the cart. Generally, the second fluid delivery system applies a clean rinse agent to ensure that the potentially harsh cleaning agents used with the first fluid delivery system and any residual contaminants are removed. Through an appropriate control scheme, the fluid delivery systems are capable of delivering a plurality of cleaning fluids individually in sequence, a mixture of multiple cleaning fluids simultaneously, or a single selected cleaning fluid. Cleaning fluid mixtures include both combinations of multiple cleaning fluids that can be simultaneously applied and the dilution of a cleaning fluid concentrate with an inert carrier such as water. The mixture ratios are adjustable to provide cost-effective cleaning based on parameters such as the cart size and shape.

The used fluids are collected in a liquid collection pan located proximate the bottom of the automatic cart wash apparatus. A drain line moves the used fluids to a drain emptying into the sewer or septic system. Alternatively, the used fluids are moved to a holding tank which holds the fluids for further processing, such as reuse within the system, recycling through an integrated recycling system or transfer to an offsite facility for disposal or recycling. A series of sensors, timers, and/or counters monitor and indicate when the cleaning fluids need to be replaced and/or when the used fluids need to be removed. The sensors, timers, and/or counters also monitor replaceable filters throughout the system.

After the cleaning stage, the drying stage uses a high-pressure air-drying system designed to substantially remove any remaining moisture from the stock cart and provide essentially instant drying of the cleaned cart. Once dried, the carts are cycled into a holding area and returned to ground level via a ramp.

A controller coordinates the processing of the carts through the automatic cart wash apparatus at the proper cycle and speed. The controller controls the automatic functioning of the automatic cart wash apparatus including the sequencing of the air blasts in the vacuum stage and the dryer stage and the cleaning fluid distribution in the cleaning stage. The controller also responds to an emergency override and manual operation selection switches.

One or more sensors provide information to a controller about the presence and/or position of a stock cart within the automatic cart wash apparatus. The control system of Figure is associated with a highly instrumented embodiment of the automatic cart wash apparatus. The control system as shown includes a first cart sensor, which detects the presence of a stock cart. When the presence of a cart is detected by the first cart sensor, the controller activates the drive motor for the conveyance system. The next sensor is a tied to the vacuum system and detects when a stock cart enters the vacuum stage. In response to the signal from the vacuum sensor, the controller activates the vacuum stages including the blower and the exhaust system. The cleaning stage sensors, notify the controller when a cart is in position for washing and rinsing. A signal from the wash sensor causes the controller to activate the brushes, and the first fluid delivery system. A signal from the subsequent rinse sensor allows the controller to activate the second fluid delivery system. Carts leaving the cleaning stage trigger the dryer sensor causing the controller to start the dryer. An exit sensor allows the controller to disengage the conveyance system.

In addition to provide a platform for the sensing mechanisms, the doors serve similar functions to the panels used to enclose the automatic cart wash apparatus. By providing separation between the stages, the doors serve to preserve the integrity of the cleaning process.

Other sensors providing information to the controller include a supply sensor system and a filter sensor system, which signal the controller of problem conditions. Upon receipt of a signal from the supply sensor system or the filter sensor system, the controller can notify the operator through a notification system. A reclamation sensor monitors fluid levels in the reclamation pan and/or the holding tank. The notification system includes indicator lights, audible alarms, and/or display panels for providing textual status information. A user interface device allows an operator to control various parameters, control schemes, and modes for the automatic cart wash apparatus.

The method performed using the automatic cart wash apparatus of the present invention is as follows. First, the automatic cart wash apparatus is activated and initialized. If there is a cart detected at the entrance by the entry sensor, the conveyor is activated. Additionally, the vacuum stage is activated. When the vacuum stage has been completed, the vacuum stage is turned off and the wash stage is turned on. Once the wash stage criterion has been met, the wash stage is deactivated and the rinse stage is activated. After the rinse stage finishes, the rinse stage is stopped and the dryer stage is started. At the conclusion of the dryer stage, the dryer is turned off. The process continues until the cart reaches the exit, at which point the conveyor is turned off. Once the entire process is complete, the automatic cart wash apparatus can be turned off.

BRIEF DESCRIPTION OF THE SEVERAL VIEWS OF THE DRAWINGS

The features of the invention will become more clearly understood from the following detailed description of the invention read together with the drawings.

DETAILED DESCRIPTION OF THE INVENTION

An automatic cart wash apparatus is shown and described at 100 in the figures. The automatic cart wash apparatus 100 provides much improved cleaning of stock carts on a regular basis over manual cleaning by store employees. The automatic cart wash apparatus 100 includes three main stages: a debris removal (vacuum) stage, a cleaning (wash, sanitize, rinse) stage, and a drying stage. The debris removal stage uses forced air and/or suction to remove solid and generally non-soluble waste, such as a paper or other trash and debris, from a stock cart. The cleaning stage uses a selection of detergents, sanitizing agents, and rinse agents to remove soluble or sticky waste, such as food and liquids, and to kill germs, viruses, and bacteria present on the cart. The drying stage removes excess liquids from the cart making it ready for use by the next customer.

Figure 1:
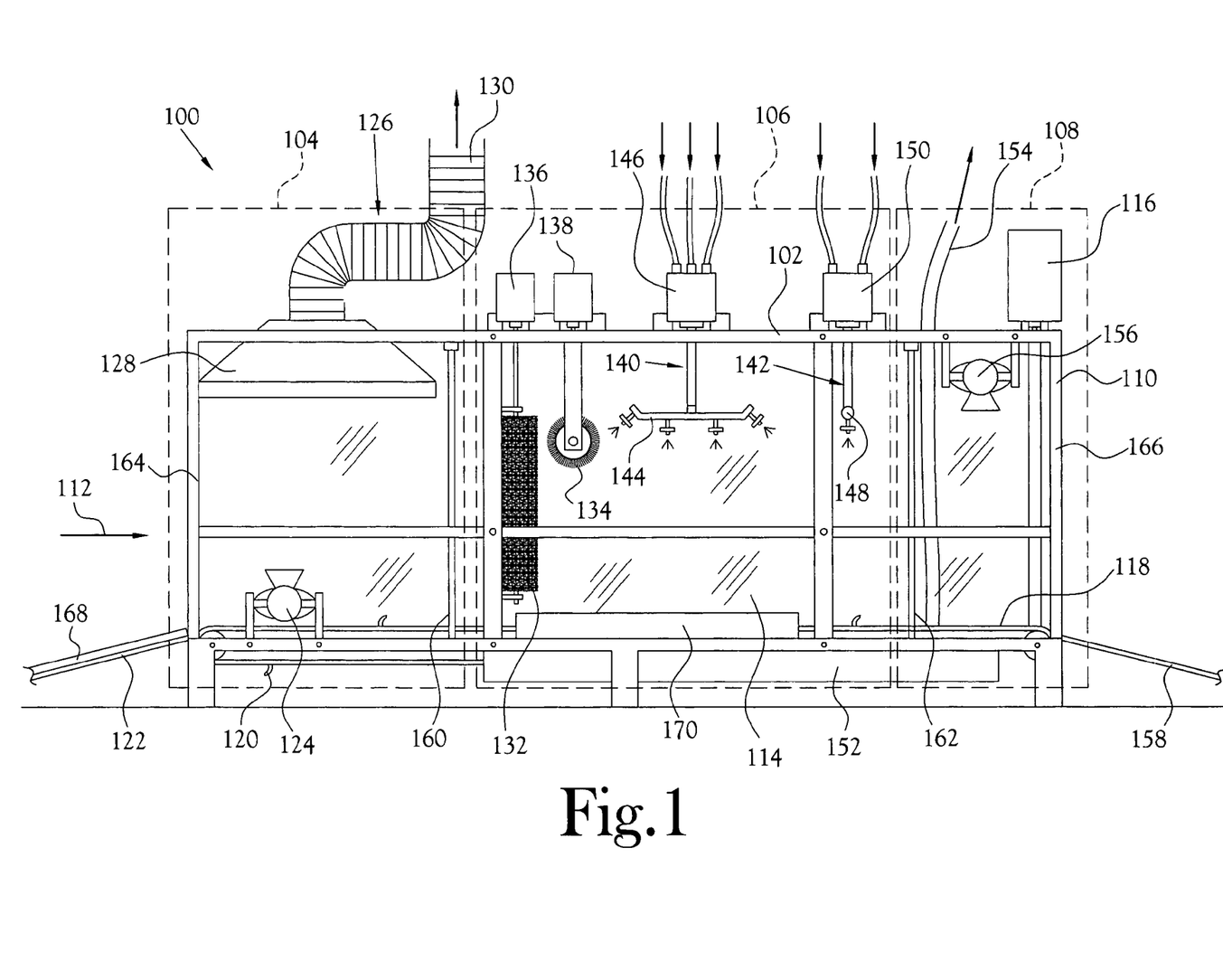
FIG. 1 is a side view of one embodiment of the automatic cart wash apparatus of the present invention.

FIG. 1 illustrates one embodiment of the automatic cart wash apparatus 100. The automatic cart wash apparatus 100 is shown as a stationary device that is installed in the cart return area of a retail outlet such as a grocery or department store. The automatic cart wash apparatus 100 includes a frame 102 that provides structure and support for the components of the automatic cart wash apparatus 100. Proximate to the entrance 104 of the automatic cart wash 100 is the vacuuming stage 106. Following the vacuuming stage 106 is the cleaning stage 108. Finally, the drying stage 110 is located after the cleaning stage 108 and proximate to the exit 110 of the automatic cart wash apparatus 100. Carts travel through the automatic cart wash apparatus 100 in the direction of the arrow 112.

Wall panels 114, ceiling panels (not visible), and floor panels (not visible) enclose the automatic cart wash apparatus 100 to form a closed cleaning system. The panels perform a variety of functions including noise reduction, containment of fluids, and limiting volume to contain and concentrate the flow of forced air and/or suction. The vacuum stage 104 is separated from the cleaning stage 106 by a door 160, such a strip door. The cleaning stage 106 is separated from the dryer stage 108 by a second door 162, such as a strip door. A door at the entry 164 and one at the exit 166 of the automatic cart wash 100 are present but not visible. In one embodiment, some or all of the panels are configured to be removable for cleaning the automatic cart wash apparatus 100 and to allow for removal of any stuck or damaged carts. In the illustrated embodiment, the wall panels are fabricated from a clear plastic material, such as LEXAN®, to allow customers and/or store employees to observe the cleaning process. Other embodiments may utilize other materials for the panels.

The doors 160, 162 serve similar functions to the panels used to enclose the automatic cart wash apparatus 100, including noise abatement, the containment of fluids, the prevention of contamination between the various stages, and the limiting of volume to improve the strength of the vacuum. By providing separation between the stages 104, 106, 108, the doors serve to preserve the integrity of the cleaning process. For example, airborne debris from the vacuum stage 104 is prevented from entering the cleaning stage 106 and recontaminating a previously vacuumed cart. Similarly, fluids from the cleaning stage 106 do not recontaminate carts being dried. By way of a third example, a door prevents forced air from the drying stage 108 from disrupting the spray pattern of the liquids in the cleaning stage 106. Further, the door at the entry 164 of the automatic cart wash apparatus 100 limits noise and, in combination with the vacuum stage door 160, contains the vacuum. The door at the entry 164 of the automatic cart wash apparatus 100 limits noise.

Examples of self-closing door constructions that allow the carts to pass between the sequential stations while maintaining separation between the stations include strip doors constructed from a multitude of overlapping, flexible, polymeric panels that allow the cart to easily push through, a door flap apparatus on spring tension that opens upon contact by the cart and closes immediately as the cart proceeds past the door opening, and a clam-shell or louver-style door that open and closes automatically in response to commands from a controller. Finally, the number and the positions of the doors can vary depending upon the design of the automatic cart wash apparatus 100 without departing from the scope and spirit of the present invention.

A conventional stock cart generally has two main locations where non-soluble debris collects. The first location is the upwardly-open basket which has a lattice construction creating numerous interstices. The basket may be subdivided. The second location is the lower shelf along the lower frame of the stock cart. The lower shelf typically is constructed using spaced-apart rails or a latticed grill. The open construction of the stock cart is conducive to debris removal using forced air and or suction. The lower frame includes two side rails generally connected by a transverse front rail. A basket support structure extends upward from the rear of the lower frame and the wheels or casters of the cart are attached to the lower frame.

Carts are carried through the automatic cart wash apparatus 100 by a conveyance system. The basic components of the conveyance system include a drive motor 116 operatively linked to a conveyor 118. In one embodiment, the conveyor 118 includes a stationary runway upon which the carts are supported and a drive belt or chain that moves the carts. In one embodiment, the runway includes openings that allow the passage of fluids used in and solids displaced by the automatic cart wash apparatus 100. A horizontal direct drive belt is one example of a suitable drive belt arrangement for use in the automatic cart wash apparatus 100. A channel or slot is defined proximate to the central longitudinal axis of the runway. The drive belt is situated within the channel. A plurality of cleats 120 extends outwardly from the drive belt. Each cleat is spaced apart from each other cleat by a selected distance related to a desired separation between the carts. The cleats are adapted to engage the frame and transfer the forward motion of the drive belt to the stock cart. The cleated drive belt conveyance moves the carts in the horizontal plane by pulling the carts. A ramp 122 allows stock carts to be moved up to the level of the conveyance system, i.e., the floor level of the automatic cart wash apparatus 100. In FIG. 1, the ramp 122 is equipped with an entry guide 164. The entry guide 164 serves to direct the cart into a standardized position for travel through the automatic cart wash apparatus 100. In one embodiment, the entry guide is a V-shaped channel having a wide mouth that tapers to a narrow exit to properly and consistently position each cart. In addition, a series of guide rails 170 help maintain the position of the carts and guide the carts through the automatic cart wash 170. In other embodiments, the ramp can be motorized or the conveyance system extended to cover the ramp to provide unattended conveyance of stock carts into the automatic cart wash apparatus 100.

The cleated drive belt conveyance is suitable where the carts being processed are identical in shape and style and are maintained in good working order. Because the cleated drive belt type conveyance relies on a single point of contact, there exists a greater potential to fail to properly engage the individual stock carts and propel them through the automatic cart wash apparatus 100. Further, carts that are defective or damaged, especially with regard to the free rotation of the wheels, present problems maintaining consistent and linear forward motion through the automatic cart wash apparatus 100. From a manufacturing perspective, the cleated drive belt type conveyance is an economic method for moving the stock carts in most applications.

In an alternate embodiment, a moving runway belt carries the stock carts through the automatic cart wash system. The runway belt conveyance is suitable for accommodating carts of various sizes or frame structures where a single point of contact is unlikely to work for all carts. The moving runway belt includes optional engagement members such as the cleats used with the drive belt of the previously described conveyor 118. In another embodiment, the moving-runway conveyance system uses one or more belts that start off on the entry 164 of the automatic cart wash apparatus 100 at an angle below the level of the front rail of the cart and increase in the angle of approximately 20 degrees for 30 inches or more. The entry angle of the belts allows the conveyance system to transport carts having the front rail located at differing or inconsistent heights. After the upward slope of the belts at the entry 164 of the automatic cart wash apparatus 100, the belts are routed to a downwardly sloping angle towards the exit 166 of the automatic cart wash apparatus 100. The downward slope allows carts to be ejected from the automatic cart wash apparatus 100 into the outside queue using gravity in addition to the drive mechanism of the conveyance system.

In the embodiment of FIG. 1, the vacuuming stage 104 includes a blower 124 and an exhaust system 126. The blower 124 is located proximate to the bottom of the frame 102 and forces air through a cart to cause debris in or on the cart to become airborne. An exhaust vent or hood 128 directs the airborne debris into an exhaust duct 130 leading away from the automatic cart wash apparatus 100. The debris is transported through the duct 130 by either forced air and/or suction. The exhaust vent 128 is generally positioned opposite to the blower 124 to catch debris dislodged by the blower 124. In the illustrated embodiment, the exhaust vent 128 is shown positioned proximate to the top of the frame 102 and opening downwardly. The blower forces air upward through the basket and towards the exhaust vent 128. In another embodiment, the exhaust vent 128 is positioned along the side of the automatic cart wash apparatus 100.

In other embodiments, multiple blowers can be used depending upon the desired flow patterns and the arrangement of the vacuuming stage 104. For example, to avoid blowing debris off of the bottom shelf into the bottom of the basket and trapping it there, a lower blower is aimed so that lower shelf debris is blown sideways. One or more basket blowers are aimed upwards at an angle to blow debris up and out of the cart. Such a blower configuration would be suitable for use with the side-mounted exhaust vent mentioned above. The volume and velocity of air is selected to move debris typically found in stock carts and is variable as desired to accomplish the desired debris removal.

The cleaning stage 106 follows the vacuum stage 104. The primary function of the cleaning stage is the application of one or more cleaning fluids to the stock cart. The cleaning fluids are selected to remove dirt and grime and/or kill germs and contaminants. The embodiment illustrated in FIG. 1 is a thorough cleaning stage 106 that begins with the use of optional brushes in combination with a high velocity spray of cleaning fluids. Following the application of cleaning fluids, a rinse is applied.

The brushes 132, 134 provide scrubbing to assist in the removal of debris attached to the cart. In conjunction with the cleaning fluids, the brushes 132, 134 thoroughly cleaning the more heavily soiled areas of the cart, such as the child transportation seat and the cart handle. A pair of vertically-mounted brushes 132 scrubs the sides of the cart while a horizontally-mounted brush 134 scrubs the handle and the child transportation seat. The vertically mounted brushes 132 serve to standardize the position of the cart and to provide stability while they are in engagement with the cart. In the illustrated embodiment, the brushes 132, 134 are powered brushes driven by a pair of motors 136, 138 that are secured to the frame 102. In various embodiments, the motion of the brushes is rotary or oscillating. In an alternate embodiment, either or both of the powered brushes are replaced by stationary brushes and the corresponding motor is eliminated.

In the illustrated embodiment, the horizontally-mounted brush 134 remains in a fixed location selected to bring it in contact with the handle of the cart. In another embodiment, the horizontally-mounted brush 134 is articulated allowing it to be lowered into and raised above the basket and seat portions of the cart and otherwise follow the contour of the cart. In other embodiments, additional brushes are added to or the described brushes are removed from the automatic cart wash apparatus 100. For example, a first set of bushes at the entrance can provide dry brushing, a second set of brushes in the spray zone can provide wet scrubbing using cleaning fluids, and a third set of brushes in the rinse area can provide additional wet scrubbing using clean rinse agents.

The illustrated embodiment of FIG. 1 includes to two fluid delivery systems 140, 142 that automatically spray and distribute the fluids onto at least the contact areas of the cart. The first fluid delivery system 140 uses a rotating sprinkler head with high velocity nozzles to spray one or more cleaning fluids onto the cart. In the illustrated embodiment, the first fluid delivery system is supplied from three supply lines entering a first intake manifold 146 attached to the frame 102. Through an appropriate control scheme, the first fluid delivery system 140 is capable of delivering a plurality of cleaning fluids individually in sequence, a mixture of multiple cleaning fluids simultaneously, or a single selected cleaning fluid. Cleaning fluid mixtures include both combinations of multiple cleaning fluids that can be simultaneously applied and the dilution of a cleaning fluid concentrate with an inert carrier such as water. The mixture ratios are adjustable to provide cost-effective cleaning based on parameters such as the cart size and shape.

A wide variety of cleaning fluids are suitable for use with the automatic cart wash apparatus 100 depending upon the desired cleaning goals. Typical cleaning fluids include water, detergents, sanitizing agents, anti-bacterial agents, anti-viral agents, anti-fungal agents, solvents, and rinse agents. The cleaning fluids are selected to kill airborne and contact contaminants and reduce the risk of consumers being contaminated by contact with the cart and of cross-contamination between carts. The atomization of the cleaning fluids is variable depending upon the size of the cart being utilized by the retailer.

The second fluid delivery system 142 is shown as a stationary, horizontal-bar sprinkler 148 with low velocity nozzles that spray a sheet of cleaning fluids over the cart. Generally, the second fluid delivery system 142 applies a clean rinse agent to ensure that the potentially harsh cleaning agents used with the first fluid delivery system 140 and any residual contaminants are removed. The second fluid delivery system 142 includes a second intake manifold 150 attached to the frame 102. The second intake manifold 150 is illustrated with to inlet lines that supply the second fluid delivery system 142. As with the first fluid delivery system 140, the second fluid delivery system 142 is capable of delivering single or multiple cleaning fluids either sequentially or simultaneously based upon an appropriate control scheme. For example, the rinse agent might be combined with a residual sanitizing agent. In other embodiments, certain cleaning fluids do not require a rinse and the cart is ready for drying immediately following the required soak time.

The used fluids and any debris dislodge by the brushes are collected in a liquid collection pan 152 located proximate the bottom of the automatic cart wash apparatus 100. A drain line 154 moves the used fluids to a drain emptying into the sewer or septic system. Alternatively, the used fluids are moved to a holding tank which holds the fluids for further processing, such as reuse within the system, recycling through an integrated recycling system or transfer to an offsite facility for disposal or recycling. A series of sensors, timers, and/or counters monitor and indicate when the cleaning fluids need to be replaced and/or when the used fluids need to be removed. The sensors, timers, and/or counters also monitor replaceable filters throughout the system.

After the cleaning stage 106, the drying stage 108 uses a high-pressure air-drying system 156 designed to substantially remove any remaining moisture from the stock cart and provide essentially instant drying of the cleaned cart. In one embodiment, the drying stage 108 uses an electric-driven motor to drive a squirrel cage blower to provide maximum air velocity to dry the stock carts before the stock carts exit from the automatic cart cleaning apparatus 100.

As a secondary function, the drying stage 108 is utilized on days when inclement weather produces precipitation, such as rain or snow, that collect on stock carts left outside. Wet stock carts make it inconvenient to shop for products in soluble packaging, such as paper and paperboard, because the water is absorbed by the packaging. In the event of inclement weather and where frequent cleaning is not desired, a dry-only mode of the automatic cart wash apparatus 100 allows for stock carts to be rapidly dried and prepared for use after being returned from outside. By not utilizing the cleaning stage and, in addition, the vacuum stage, the throughput of the automatic cart wash apparatus is increased. In an alternate embodiment, a truncated version of the automatic cart wash apparatus incorporating only the drying stage offers a reduced cost option where inclement weather is prevalent but frequent cleaning is not desired.

Figure 6:
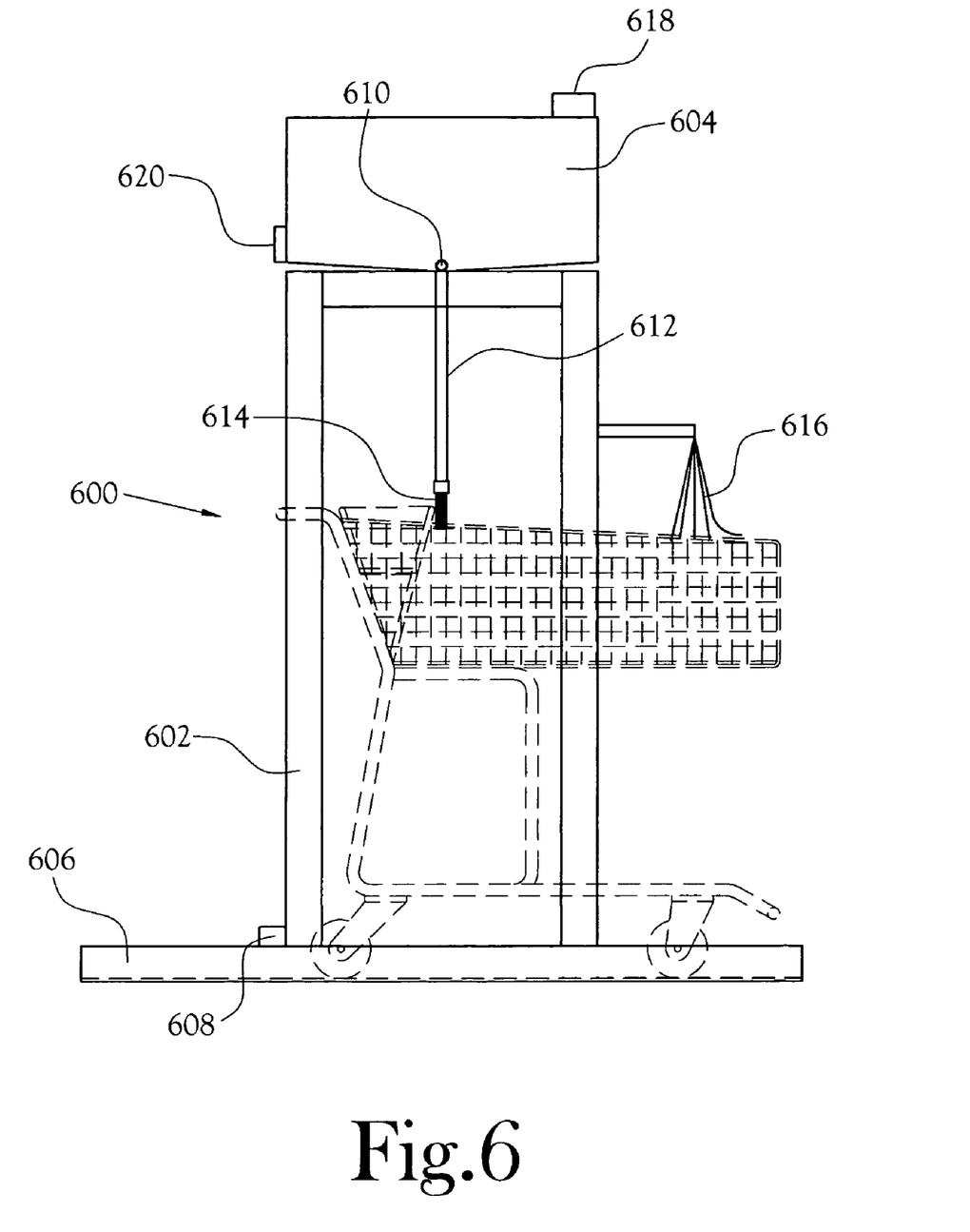
FIG. 6 is an illustration of one embodiment of a manual cart wash apparatus according to the present invention.

In an alternate embodiment, the air developed in the drying stage 108 is recaptured and directed to the vacuum stage 104 via a vent 600 and an additional blower 602, as shown in FIG. 6. Venting the air from the drying stage 108 also allows the automatic cart wash apparatus 100 to release the pressure in the drying stage 108 so as not to blow the door seals open.

Once dried, the carts are cycled into a holding area and returned to ground level via a ramp 158. The automatic cart wash apparatus 100 integrates into the traditional cart queue. Usage of the cart is either provided free of charge or for a fee to the consumer. Using the optional pay-for-services apparatus, which accepts standard forms of payment including cash and credit cards, allows the customer to obtain a freshly cleaned cart apparatus and then return it to the cart base for a form of refund. Alternatively, carts can be checked out against an identification account, such as a store discount card. If the cart is not returned, an invoice can be sent or the fee assessed to the customer upon the next visit to the store. The motivation to return the carts from the parking lot area for a refund or to avoid incurring a fee eliminates unnecessary dangers to the automobiles parked in the parking lot and also the costs associated with having one or more store employees retrieve unattended carts from the parking lot. Even if the revenue received from the cart "for pay" station was then fully refunded, the cost to retrieve the carts from the parking lots and the related liabilities of damage to automobiles and/or carts and of cart theft should cover the utility costs of the system.

Figure 2:
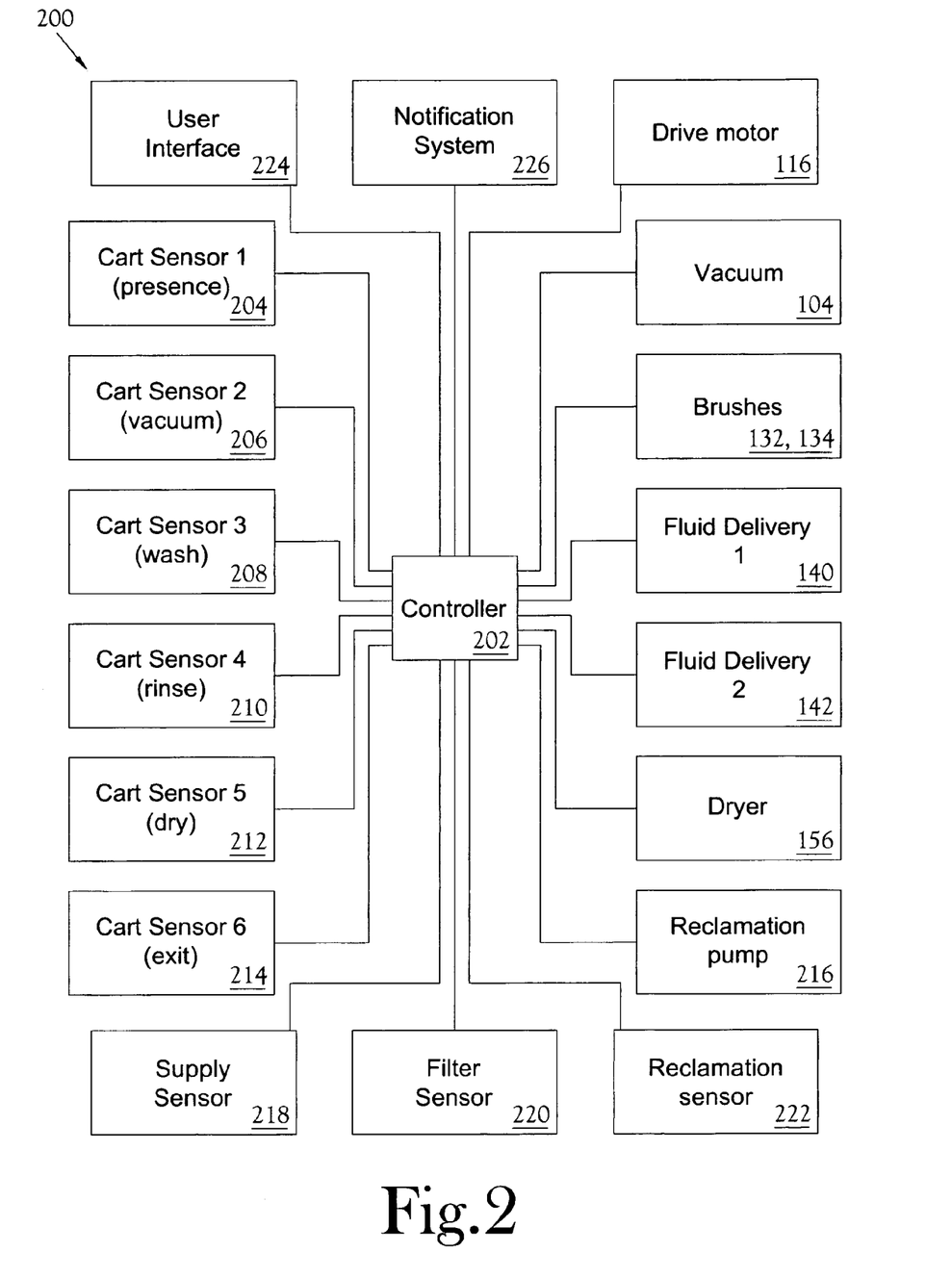
FIG. 2 is a block diagram of the control system for one embodiment of the automatic cart wash apparatus.

FIG. 2 illustrates one embodiment of a control system 200 for the automatic cart wash apparatus of the present invention. A controller 202 coordinates the processing of the carts through the automatic cart wash apparatus 100 at the proper cycle and speed. The controller 202 controls the automatic functioning of the automatic cart wash apparatus 100 including the sequencing of the air blasts in the vacuum stage 104 and the dryer stage 108 and the cleaning fluid distribution in the cleaning stage 106. The controller 202 also responds to an emergency override and manual operation selection switches.

One or more sensors provide information to a controller 202 about the presence and/or position of a stock cart within the automatic cart wash apparatus. The control system of FIG. 2 is associated with a highly instrumented embodiment of the automatic cart wash apparatus 100. The control system 200 as shown includes a first cart sensor 204, which detects the presence of a stock cart. When the presence of a cart is detected by the first cart sensor 204, the controller 202 activates the drive motor 116 for the conveyance system. The next sensor 206 is a tied to the vacuum system and detects when a stock cart enters the vacuum stage 104. In response to the signal from the vacuum sensor 206, the controller 202 activates the vacuum stages 104 including the blower 124 and the exhaust system 126. The cleaning stage sensors 208, 210 notify the controller 202 when a cart is in position for washing and rinsing. A signal from the wash sensor 208 causes the controller 202 to activate the brushes 132, 134 and the first fluid delivery system 140. A signal from the subsequent rinse sensor 210 allows the controller 202 to activate the second fluid delivery system 142. Carts leaving the cleaning stage 106 trigger the dryer sensor 212 causing the controller to start the dryer 156. An exit sensor 214 allows the controller 202 to disengage the conveyance system.

In various embodiments the controller 202 of the present invention is implemented using devices including, but not limited to, analog logic circuits, digital logic circuits, programmable interrupt controllers, programmable logic controllers, microcontrollers, microprocessors, Stamp controllers, and similar devices. Where complex logic is not necessary or desired, simple control circuits such a series of timers or counters that react to a trigger such as the detector of the presence of a cart and activate one or more components of the automatic cart wash apparatus 100 for specified time periods are used. More advanced controllers provide the ability to customize the process and more precisely control the application of the process to a cart.

Both optical and mechanical sensors can be used in the control system 200 depending upon the desired sophistication of the process control. Optical sensors must be isolated from interference by airborne debris and moisture so they remain effective. Similarly, mechanical sensors must be protected to avoid being rendered ineffective by debris and moisture. In one embodiment, the sensors are used in conjunction with the doors that separate the various stages of the automatic cart wash apparatus 100. In another embodiment, the sensors are independent of other components, such as the doors.

Other sensors providing information to the controller 202 include a supply sensor system 218, such as a series of flow sensors on the inlet lines to the intake manifolds 146, 150, which indicates when insufficient fluid is passing through the corresponding supply line. Insufficient fluid flow is primarily indicative that the attached fluid supply is empty and secondarily indicative of a problem such a leak or blockage in the supply line. Upon receiving a signal from the supply sensor 218, the controller 202 can notify an operator that the supply system needs attention. A filter sensor system 220 utilizes a series of sensors that detect restricted or excessive flow through any filters used in the automatic cart wash system 100, which is indicative of conditions such as a clogged or missing filter. As before, upon receipt of a signal from the filter sensor 220, the controller can notify the operator through the notification system 226. Finally, a reclamation sensor 222 monitors fluid levels in the reclamation pan 152 and/or the holding tank. For example, when the reclamation pan 152 is full the controller 202 can activate a reclamation pump 216 to move fluid from the reclamation pan 152 to a holding tank. With the reclamation sensor 222 monitoring the holding tank, the controller can notify an operator that the holding tank needs to be emptied or otherwise attended to through the notification system 226. The notification system 226 is typically local to the automatic cart wash system 100 and includes indicator lights, audible alarms, and/or display panels for providing textual status information. In addition, status information can be transferred to a remote location, such as the retailer's office area, through conventional data transfer methods including, but not limited to, wired or wireless communications and across global networks such as the internet.

Finally, a user interface device 224 allows an operator to control various parameters, control schemes, and modes for the automatic cart wash apparatus 100. For example, the dry-only mode previously mentioned could be activated from the user interface device 224. The user interface device 224 can control the sequencing, mixture, atomization, and/or selection of cleaning fluids used based upon the preferences of the operator. Other parameters such as the cleaning fluid temperature or the air temperature used to dry the cart can be controlled at the user interface device 224 in some embodiments. The process, including the steps performed and/or the parameters used, is customizable by the operator.

Figure 3:
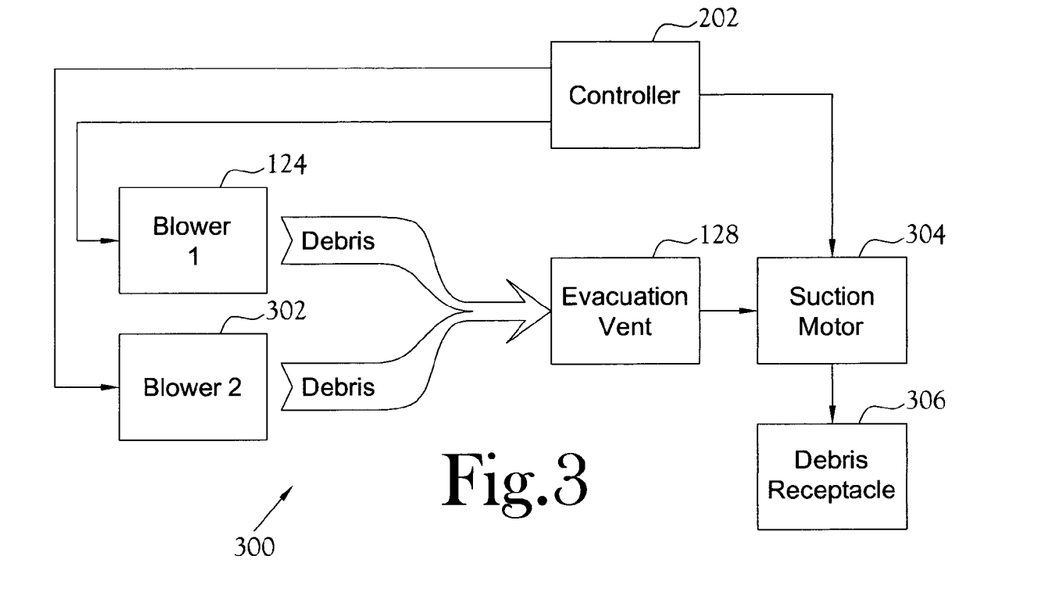
FIG. 3 is a block diagram of the vacuum stage of one embodiment of the automatic cart wash apparatus.

FIG. 3 is a block diagram of an embodiment of the vacuum stage 300. The vacuum stage 300 illustrated in FIG. 3 uses more than one blower 124, 302, as previously described. The blowers generate air blasts that cause generally non-soluble debris to become airborne where it is captured by the evacuation vent 128. A suction motor 304 creates negative air pressure at the evacuation vent 128 and draws the airborne debris into a debris receptacle 306 for later disposal. Operation of the blowers 124, 302 and the suction motor 304 are controlled by the controller 302.

Figure 4:
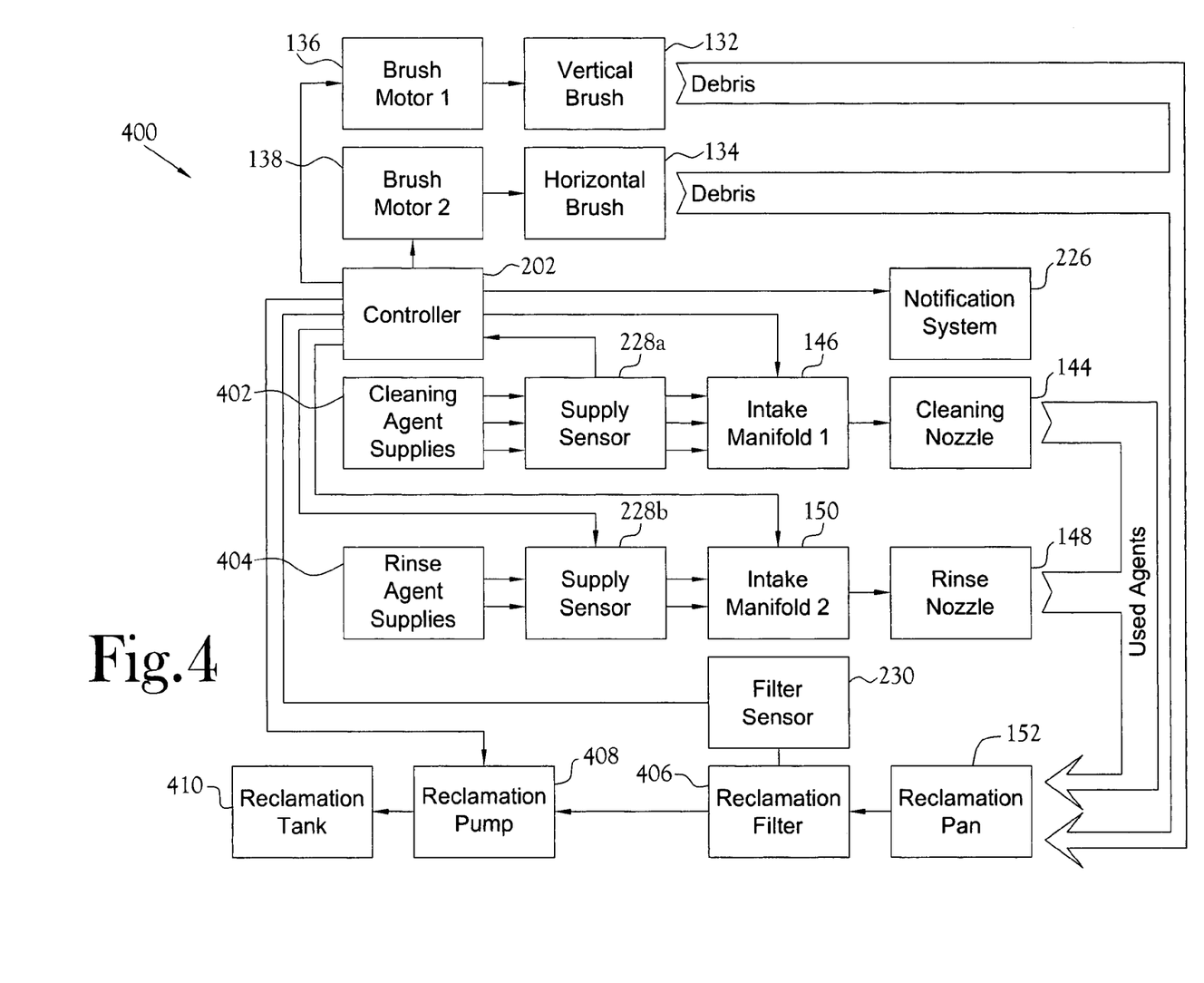
FIG. 4 is a block diagram of the cleaning stage of one embodiment of the automatic cart wash apparatus.

FIG. 4 is a block diagram of an embodiment of the extended cleaning stage 400 including the reclamation system. The controller 202 provides sequencing and control of the cleaning stage 400. The brush motors 136, 138 are responsive to the controller 202 and generate scrubbing movement in the brushes 132, 134. Debris dislodged by the brushes 132, 134 is captured in the reclamation pan 152. For reference, the runway, whether belt or platform, is designed with an open construction such as a lattice or grill that allows fluids and debris to pass through into the reclamation pan 152. The controller 202 also controls valves associated with the intake manifolds 146, 150 to control the flow and/or mixture of the cleaning fluids from the supplies 402, 404. The sensors 228a, 228b associated with the supplies 402, 404 signal the controller 202 when a problem exists on the supply side. The controller 202 can take appropriate action including stopping the automatic cart wash system 100 and notifying the operator through the notification system. The cleaning fluids are sprayed onto the stock cart through the nozzles 144, 148. The used cleaning fluids are collected in the reclamation pan 152. A filter 406 on the outlet of the reclamation pan 152 traps debris exceeding a selected size from be moved into the holding tank 410 when the pump 408 is activated by controller 202. Should flow through the filter 406 become restricted past a specified level, the filter sensor 230 signals the controller 202. The controller can take appropriate actions including disengaging the pump 408 and notifying the operator through the notification system 226.

Figure 5:
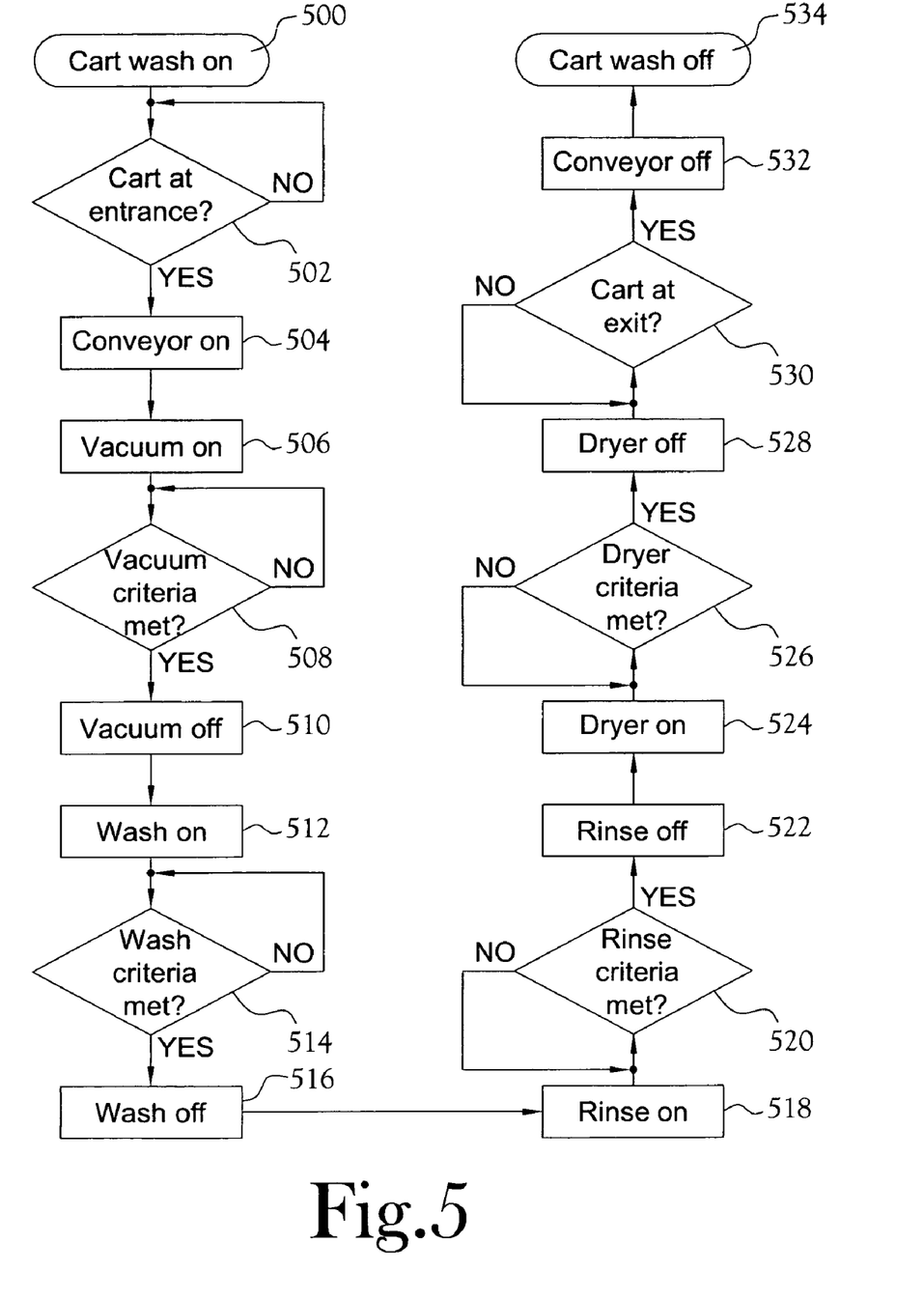
FIG. 5 is a flow chart of one embodiment of the method of operation of the automatic cart wash apparatus.

FIG. 5 is a flow diagram of one embodiment of the method performed using the automatic cart wash apparatus of the present invention. First, the automatic cart wash apparatus is activated and initialized 500. If there is a cart detected at the entrance by the entry sensor, the conveyor is activated 502. Additionally, the vacuum stage is activated 504. When the vacuum stage has been completed 508, the vacuum stage is turned off 510 and the wash stage is turned on 512. Once the wash stage criterion has been met 514, the wash stage is deactivated 516 and the rinse stage is activated 518. After the rinse stage finishes 520, the rinse stage is stopped 522 and the dryer stage is started 524. At the conclusion of the dryer stage 526, the dryer is turned off 528. The process continues until the cart reaches the exit 530, at which point the conveyor is turned off 532. Once the entire process is complete, the automatic cart wash apparatus can be turned off 534.

The method embodied in FIG. 5 applies generally to a situation where the automatic cart wash apparatus 100 operates on a single cart. More specifically, the embodied method utilizes a highly instrumented automatic cat wash apparatus 100 having multiple sensors for detecting the location of the cart. In this manner, the position of the cart within the automatic cart wash apparatus 100 is tracked and only the stage currently being accessed by the cart is activated. The result is a highly efficient automatic cart wash apparatus 100 that minimizes the waste of resources. The method shown in FIG. 5 represents one of the more sophisticated embodiments of the automatic cart wash apparatus 100.

Through the use of sensors, the decisions at steps 502, 508, 514, 520, 526, and 530 are made based on the presence or absence of a cart. Certain of the decisions can be combined and/or eliminated depending upon the methodology behind the cleaning process. For example, the activation of the wash stage and the rinse stage may be combined without departing from the scope and spirit of the present invention.

In other embodiments, the method shown in FIG. 5 is varied. For example, carts are often washed in bulk. Several carts can be washed simultaneously using the automatic cart wash of the present invention. The automatic cart wash apparatus of the present invention is designed to operate on multiple carts simultaneously. The carts are cleaned sequentially with a trailing cart using the stage vacated by a preceding cart. When the method of FIG. 5 operates on multiple carts, multiple and potentially conflicting parts of the method can be performed simultaneously. Therefore, some embodiments of the present invention add rules of precedence to the functions. For example, a cart exiting the automatic cart wash apparatus does not cause the conveyor to stop while another cart is being processed or the entrance of a cart into the cleaning stage does not deactivate the vacuuming stage on a trailing cart. There are multiple ways to implement the rules of precedence. In one implementation, the detection of a cart at the entrance while another stage is currently active can disable the deactivation functions temporarily.

In another embodiment, the control program operates based upon timing. In general, only a single entrance sensor is required and all other controls occur at a fixed time relative to the entrance event. More specifically in this embodiment, the criteria being evaluated by the method of FIG. 5 is whether a specified amount of time since a trigger has elapsed. Because the speed of the conveyor is known, the length of time for a cart to reach each stage and the length of time that the cart remains within each stage is known. Various timing sequences are employed in other embodiments to start and stop stages as desired.

In still further embodiments, the automatic cart wash apparatus utilizes more brute force methods. One of the less sophisticated methods turns all stages on when the presence of a cart is detected at the entrance and turns all stages off when the cart is detected at the exit. In the most basic operation, the activation and deactivation of all stages is accomplished using a manual switch without regard to the presence or absence of a cart.

In addition to the automatic and semi-automatic embodiments of the cart wash apparatus, FIG. 6 illustrates a manual cart wash apparatus 600 for use in places where electrical service and water are not available and/or the automatic or semi-automatic embodiments are not desirable, for example, in stores where the volume of stock cart usage is low. The manual cart wash apparatus 600 may be desirable where the store carries fewer food-related products likely to contain more food borne bacteria related to illnesses, such as in the hardware industry where stock carts are utilized but the primary or only source of contamination is the user of the stock cart.

The manual cart wash apparatus 600 includes a frame 602 supporting a fluid tank 604. A set of guide rails 606 direct the stock cart through the manual cart wash apparatus 600. Stock carts are pushed manually through the manual cart wash apparatus 600. A switch 608 mounted on the frame 602 or the guide rails 606 and in communication with a drain 610 in the fluid tank 604 releases a free flow of antibacterial fluid onto the main contact areas of the stock cart. In one embodiment, the switch 608 is a whisker switch. The antibacterial fluid flows through an outlet pipe 612 that ends in a nozzle having a brush 614 that engages and scrubs the main contact areas of the stock cart. A wiper 616 of cloth strips engages and wipes the main contact areas of the stock cart to partially dry the antibacterial fluid. In another embodiment, an electrical drying apparatus, similar to that shown in the automatic cart was apparatus 100, is used in addition to or in lieu of the cloth strip wiper 616. The electrical drying apparatus is beneficial in inclement weather to remove water or snow from the stock carts.

The fluid tank 604 is located directly above the cart travel area allowing the antibacterial fluid to flow by gravity until the stock cart stops moving. The fluid tank is equipped with an inlet 618 for adding the desired cleaning fluid and with a level gauge 620 for allowing the operator to monitor the level of the cleaning fluid. In another embodiment, a sensor or a timer, similar to those described in relation to the automatic cart wash apparatus 100, in communication with the drain 610 prevents the antibacterial fluid from flowing in case one of the manual switches is left in the open position.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An apparatus for cleaning a wheeled stock cart having a basket with a lattice
   construction, said apparatus comprising:
   a vacuum stage comprising:
      a blower for directing forced air though the wheeled stock cart, said forced air dislodging debris from the wheeled stock cart; and
      a suction system drawing said forced air and debris away from the wheeled stock cart;
   a cleaning stage following said vacuum stage, said cleaning stage comprising a nozzle assembly for spraying a selected liquid onto the wheeled stock cart;
   a drying stage following said cleaning stage, said drying stage comprising a dryer positioned to direct forced air onto the wheeled stock cart; and
   a conveyance mechanism comprising:
      a runway providing a platform for the wheeled stock cart; and
      a drive mechanism cooperating with said runway, said drive mechanism moving the wheeled stock carts along said runway through said apparatus.

2. The apparatus of claim 1 further comprising a entry door covering an entrance to said vacuum stage, a stage door covering an exit from said vacuum stage, and an exit door covering an exit from said drying stage.

3. The apparatus of claim 1 wherein said suction system comprises:
   a vent capturing said forced air produced by said blower and debris carried by said forced air;
   a duct connected to said vent; and
   a suction motor in fluid communication with said duct, said suction motor drawing said forced air and debris through said duct.

4. The apparatus of claim 3 wherein said suction system further comprises a debris receptacle connected to said duct.

5. The apparatus of claim 3 wherein said cleaning stage further comprises a reclamation system, said reclamation system comprising:
   a basin positioned beneath said runway, said basin capturing solids and fluids passing through said runway;
   a basin drain located in said basin, said basin drain providing an outlet for said used liquids;
   a reclamation pump in communication with said basin drain, said reclamation pump extracting said used liquids from said basin; and
   a reclamation filter located proximate an inlet of said basin drain, said reclamation filter preventing solids from entering said basin drain.

6. The apparatus of claim 1 wherein said cleaning stage further comprises at least one brush configured to engage at least a portion of the wheeled stock cart.

7. The apparatus of claim 6 wherein said at least one brush includes a vertically-mounted brush engaging a side of the wheeled stock cart.

8. The apparatus of claim 6 wherein said at least one brush includes a horizontally-mounted brush positioned to engage the wheeled stock cart from above.

9. The apparatus of claim 6 wherein said at least one brush is a stationary brush.

10. The apparatus of claim 6 wherein said at least one brush is a moving brush, said moving brush moving with a movement type selected from the group consisting of rotary motion and oscillating motion.

11. The apparatus of claim 1 wherein a plurality of liquids is used to clean and rinse the wheeled stock cart, said cleaning stage further comprising a manifold comprising a plurality of inlets and an outlet, said outlet in fluid communication with said nozzle assembly, each of said plurality of inlets associated with one of said plurality of liquids, each of said plurality of inlets in fluid communication with one of a plurality of input valves controlling flow of one of said plurality of liquids into said manifold.

12. An apparatus for cleaning a wheeled stock cart having a basket with a lattice
    construction, said apparatus comprising:
    a frame;
    at least one blower positioned below the basket of the wheeled stock cart, said at least one blower oriented to direct forced air upwards through the basket, said forced air configured to remove debris from the basket, said at least one blower connected to said frame;
    an evacuation hood positioned over said at least one blower, said evacuation hood receiving said forced air and the debris, said evacuation hood mounted on said frame;
    a debris receptacle in communication with said evacuation hood;
    a suction system in communication with said evacuation hood and said debris receptacle, said suction system drawing the debris to said debris receptacle;
    at least one vertically-mounted brush, said at least one vertically-mounted brush engaging a side of the wheeled stock cart, said at least one vertically-mounted brush connected to said frame;
    at least one horizontally-mounted brush, said at least one horizontally-mounted brush positioned to engage the wheeled stock cart from above, said at least one horizontally-mounted brush connected to said frame;
    a manifold accepting an input of at least one liquid and passing a selected liquid to an output;
    at least one nozzle assembly for spraying a selected liquid over the wheeled stock cart, each of said at least one nozzle assembly associated with a corresponding output of said manifold, said at least one nozzle assembly connected to said frame;
    a reclamation pan positioned beneath said at least one nozzle assembly, said reclamation pan receiving said selected liquid from said at least one nozzle assembly as a used liquid;
    a drain located in said reclamation pan, said drain providing an outlet for said used liquid;

a reclamation pump in communication with said drain, said reclamation pump extracting said used liquids from said reclamation pan;

a reclamation filter located proximate an inlet of said drain, said reclamation filter preventing solids from entering said drain;

a dryer positioned to direct forced air onto the wheeled stock cart, said dryer connected to said frame;

a runway passing through said frame, said runway providing a platform for the wheeled stock carts; and a drive mechanism cooperating with said runway, said drive mechanism transporting the wheeled stock carts along said runway.

13. The apparatus of claim 12 further comprising a start sensor in communication with said drive mechanism, said start sensor detecting when a wheeled cart is at an entrance of said apparatus and activating said drive mechanism.

14. The apparatus of claim 12 further comprising a vacuum sensor in communication with said at least one blower and with said suction system, said vacuum sensor detecting when a wheeled cart is within a vacuum area of said apparatus and activating said at least one blower and said suction system.

15. The apparatus of claim 12 further comprising a wash sensor in communication with said at least one blower and with said suction system, said vacuum sensor detecting when a wheeled cart is within a vacuum area of said apparatus and activating said at least one blower and said suction system.

* * * * *